United States Patent
Nagoya

(10) Patent No.: US 7,340,637 B2
(45) Date of Patent: Mar. 4, 2008

(54) SERVER DUPLEXING METHOD AND DUPLEXED SERVER SYSTEM

(75) Inventor: Mitsugu Nagoya, Tokyo (JP)

(73) Assignee: DUAXES Corporation, Tokyo (JP)

( * ) Notice: Subject to any disclaimer, the term of this patent is extended or adjusted under 35 U.S.C. 154(b) by 905 days.

(21) Appl. No.: 10/312,499

(22) PCT Filed: Jan. 31, 2002

(86) PCT No.: PCT/JP02/00769

§ 371 (c)(1),
(2), (4) Date: Apr. 22, 2003

(87) PCT Pub. No.: WO02/077818

PCT Pub. Date: Oct. 3, 2002

(65) Prior Publication Data

US 2003/0172093 A1    Sep. 11, 2003

(30) Foreign Application Priority Data

Mar. 26, 2001  (JP) ............................. 2001-088920

(51) Int. Cl.
*G06F 11/16* (2006.01)
*G06F 15/167* (2006.01)
(52) U.S. Cl. ......................................... 714/6; 709/214
(58) Field of Classification Search ................. None
See application file for complete search history.

(56) References Cited

U.S. PATENT DOCUMENTS 4,823,256 A    4/1989  Bishop et al.
5,513,314 A *  4/1996  Kandasamy et al. ........... 714/6

(Continued)

FOREIGN PATENT DOCUMENTS

JP    63-236137    10/1988

(Continued)

OTHER PUBLICATIONS

Patent Abstracts of Japan, publication No. 2000-276365, publication date Oct. 6, 2000.

(Continued)

*Primary Examiner*—Patrice Winder
(74) *Attorney, Agent, or Firm*—Osha Liang LLP

(57) ABSTRACT

A method of duplicating servers and a duplicated server system that make seamless transition of service in case of server failures possible. The duplicated server system comprises first and second servers that are connected to a network and have the same network address, communication means for making high-speed communication between both servers possible, and switchover controller that designates the first server as the primary server put in operation for other computers and the second server as the secondary server in normal condition. When the first server receives a service request addressed to the system, it passes the service request to the application for processing. The first server sends the recovery data output by the application to the second server by means of the communication means. If the processing related to the service request involves an update of the data held on the server system, the second server executes the application using the recovery data sent from the first server to keep the data held on both servers identical. Service requests and the results of the processing are stored in the stacks in both servers in duplicate.

4 Claims, 4 Drawing Sheets

U.S. PATENT DOCUMENTS

| | | | | |
|---|---|---|---|---|
| 5,781,910 | A | * | 7/1998 | Gostanian et al. ............ 707/10 |
| 6,023,772 | A | * | 2/2000 | Fleming ...................... 714/11 |
| 6,144,941 | A | * | 11/2000 | Hotti et al. ................... 707/10 |
| 6,397,307 | B2 | * | 5/2002 | Ohran ........................ 707/202 |
| 6,421,688 | B1 | * | 7/2002 | Song .......................... 707/202 |

FOREIGN PATENT DOCUMENTS

| | | |
|---|---|---|
| JP | 11-502658 | 3/1999 |
| JP | 2000-276365 | 10/2000 |
| WO | WO 95/00906 A1 * | 1/1995 |
| WO | WO-97/27541 | 7/1997 |
| WO | WO 98/49620 A1 * | 11/1998 |
| WO | WO 00/60463 A1 * | 10/2000 |

OTHER PUBLICATIONS

Patent Abstracts of Japan, publication No. 63-236137, publication date Oct. 3, 1988.

Supplementary European Search Report issued for EP Application No. 02711259; Dated Sep. 23, 2005; (2 pages).

Japanese Office Action for Japanese Application No. 2001-088920, mailed on Mar. 20, 2007, with English translation thereof (10 pages).

* cited by examiner (A)

(B)

SERVER DUPLEXING METHOD AND DUPLEXED SERVER SYSTEM

FIELD OF THE INVENTION

The present invention relates to servers, and more particularly to the technology for enhancing the reliability of servers by duplicating them.

BACKGROUND

Some of the servers that provide service to a large number of clients over a network are required to have a particularly high reliability for the nature of the services. A measure often employed to meet such a requirement is to duplicate the server by using another server (so called mirror server) which takes over the service task of the server in case of server failure. In such duplicated server systems, the data (herein referred to as application data) used in application processing on the two servers that make up a server system is always kept identical by connecting the two servers by means of high-speed communication means.

Even in such duplicated server systems, however, if there is a time difference in making the contents of the application data on both servers identical, the service being carried out must be started again from the beginning when the mirror server (secondary server) takes over the tasks in case of server failure while the server that normally provides service for other computers (referred to as the primary server) is actually performing service.

From this point of view, it is desired that the service being carried out at the occurrence of server failure is also continued by seamless transition such that the occurrence of failure is not perceived by the client who requested the service.

The object of the present invention is therefore to provide a method of duplicating servers that makes seamless transition of the service being carried out at the occurrence of server failure possible, and duplicated server system and database system mirror-backed-up according to the method.

SUMMARY OF THE INVENTION

In general, in one aspect, the invention relates to a method for duplicating a first and a second server in a system. The method includes storing an application used for a service task and corresponding application data in each of a first and a second storage device, responding to a service request by storing the service request and output data as a data log in each of a first and a second stack, forming an address space that is the same in each of a first and a second shared memory. The method further includes passing the service request from the first server to an application for updating application data received over the network after the service request is received. The first server includes the first storage device, the first stack, and the first shared memory and the second server includes the second storage device, the second stack, and the second shared memory, and the first and the second server are configured to connect to a network and are assigned the same network address. The application is configured to process the service request and write the application data used during processing to each of the first and the second shared memory as recovery data. The application is further configured to store the recovery data written to the first and the second shared memory to the first and the second stack. The second server is configured to is configured to update the application data by executing the application using the recovery data stored in the first and the second shared memory, where the application data stored on the first server is always identical to the application data stored on the second server.

In general, in one aspect, the invention relates to a method for duplicating a first and a second server in a system. The method includes storing an application used for a service task and corresponding application data in each of a first and a second storage device, responding to a service request by storing the service request and output data as a data log in each of a first and a second stack, where the service request does not comprise a request to update the application data, forming an address space that is the same in each of a first and a second shared memory, and passing the service request from the first server to an application for updating application data received over the network after the service request is received. The first server includes the first storage device, the first stack, and the first shared memory and the second server includes the second storage device, the second stack, and the second shared memory, and the first and the second server are configured to connect to a network and are assigned the same network address. The application is configured to process the service request, to send the output data back to a client over the network, to write the application data used during processing to each of the first and the second shared memory as recovery data, and store the recovery data written to the first and the second shared memory to the first and the second stack. The second server is configured to execute the application using the data log in the first and the second stacks.

In general, in one aspect, the invention relates to a duplicated system server. The duplication system server includes a first server and a second server. The first server includes a first storage device, a first stack, and a first shared memory. The second server includes a second storage device, a second stack, and a second shared memory. The first and second server being configured to connect to a network and are assigned to the same network address. The first and the second storage devices are configured to store at least one application used for service tasks and application data, the first and the second stacks are configured to store a service request and configured to store output data in a data log in response to the service request, the service request does not comprise a request to update the application data, and the first and the second shared memories are configured to form the same address space. The duplicated system server further includes a switchover control configured to switch operation modes of the first and the second server. When the service request for updating the application data is received over the network, the switchover control switches the operation mode of the first server to service mode and the operation mode of the second server to standby mode. The first server is configured to pass the service request to the application for processing when the service request is received. The application being configured to: process the service request, write application data used during processing to the first and the second shared memories as recovery data, and store the recovery data written to the first and second shared memories in each of the first and second stacks. The second server is configured to update the application data by executing the application using the recovery data stored in the first and the second shared memories. The first and the second servers are configured to store identical application data.

In general, in one aspect, the invention relates to a duplicated system server. The duplicated system server includes a first server and a second server. The first server includes a first storage device, a first stack, and a first shared memory and the second server includes a second storage device, a second stack, and a second shared memory. The first and second server are configured to connect to a network and are assigned to the same network address. The first and the second storage devices are configured to store at least one application used for service tasks and application data, the first and the second stacks are configured to store a service request and configured to store output data in a data log in response to the service request, and the first and the second shared memories are configured to form the same address space. The duplicated system server further includes a switchover control configured to switch operation modes of the first and the second server. When the service request for updating the application data is received over the network, the switchover control switches the operation mode of the first server to service mode and the operation mode of the second server to standby mode. The application is configured to: process the passed service request, send the output data back to a client over the network, write the output data to the first and the second shared memories as recovery data, and store the recovery data written to the first and the second shared memories in each of the first and the second stacks. The second server is configured to execute the application using the data log in the first and the second stacks.

DESCRIPTION OF PREFERRED EMBODIMENTS

Figure 1:
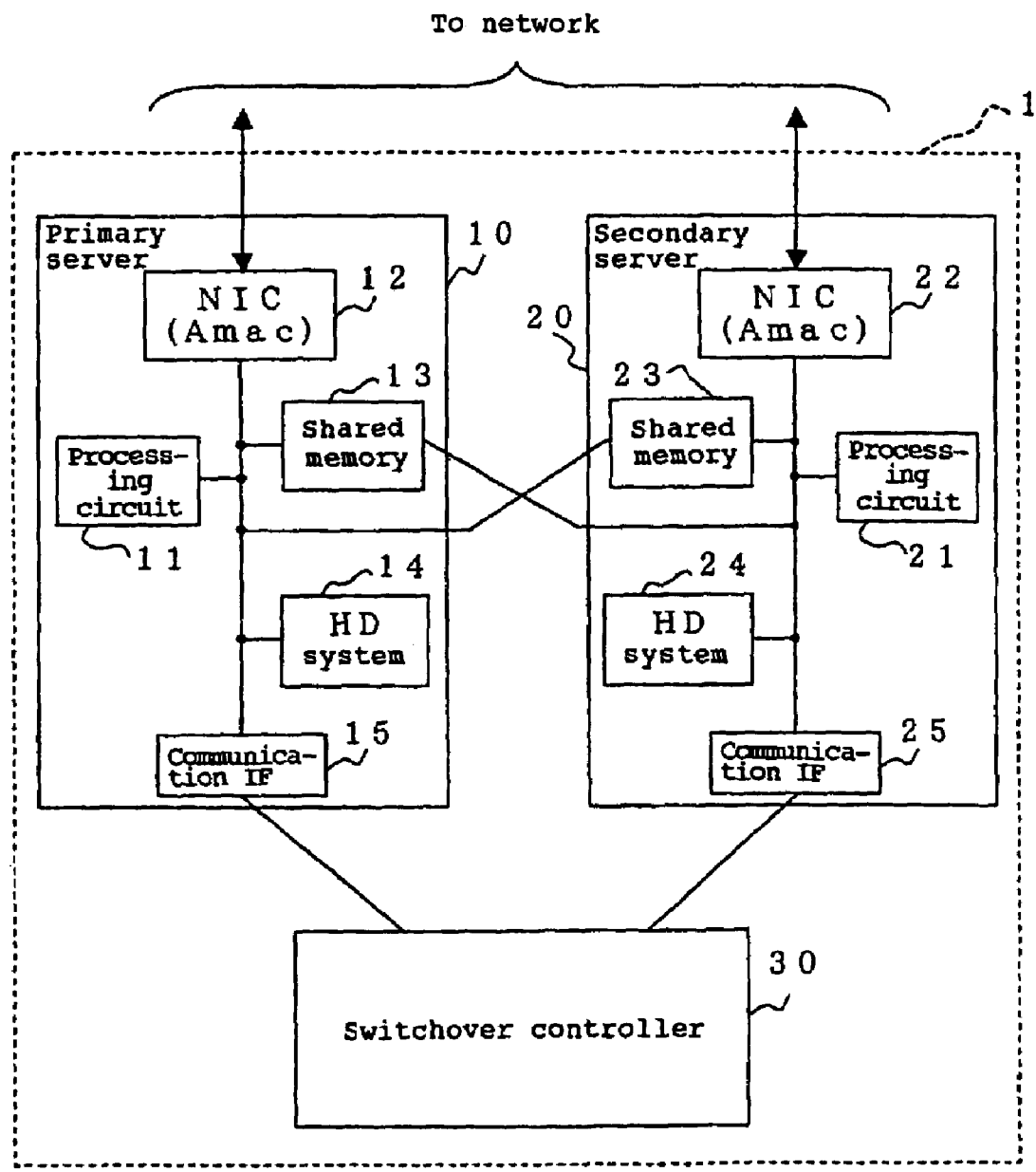
FIG. 1 is a simplified block diagram that shows the hardware architecture of the duplicated server system being an embodiment of the present invention.

FIG. 1 is a simplified block diagram that shows the hardware architecture of the duplicated server system being an embodiment of the present invention. In FIG. 1, the duplicated server system 1 comprises two servers 10 and 20 that are connected to a network and have substantially the same hardware architecture and a switchover controller 30 that controls the switching of the operation mode of the servers 10 and 20.

Since the servers 10 and 20 have substantially the same configuration, both servers are hereinafter referred to like "servers 10, 20" and only one server is described. The servers 10 and 20 each are computers suitable for a server. Each of the servers 10 and 20 has a processing circuit 11, 21 which includes a microprocessor and a memory not shown in the Figure, NIC (Network Interface Card) 12, 22 serving as the interface to the network, shared memory 13, 23 used for communication between the servers 10 and 20, HD (Hard Disk) system 14, 24, and communication interface 15, 25 for communication with the switchover controller 30.

The NICs 12 and 24 are assigned the same MAC (Media Access Control) address Amac so that the servers 10 and 20 appear as a single computer to the network. The shared memories 13 and 23 are dual-port RAMs (Random Access Memories) for high-speed communication between the servers 10 and 20, and have the same addresses assigned to form identical address spaces (referred to as shared memory spaces) on the individual servers. The shared memories 13 and 23 are configured so that, when one of the servers 10 and 20 writes data to its own shared memory space, the same data is written to both shared memories 13 and 23 substantially at the same time.

Figure 2:
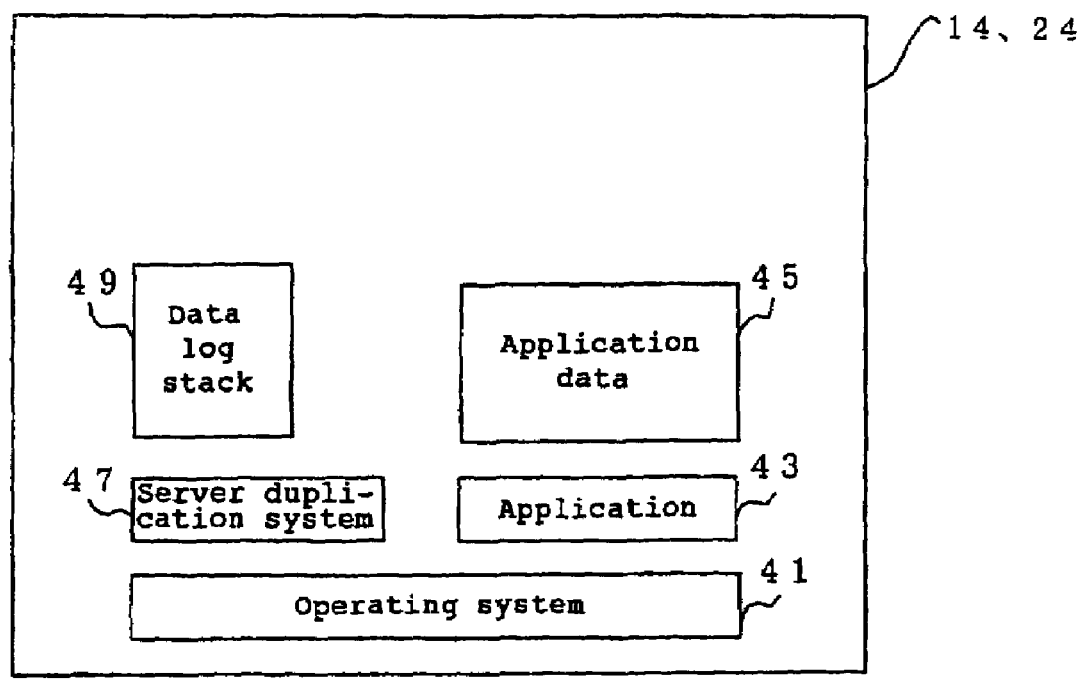
FIG. 2 shows the data configuration in the HD system of FIG. 1.

The HD systems 14 and 24 have the same configuration consisting of at least one hard disk drive. FIG. 2 shows an example of the contents that are stored in the HD systems 14 and 24. In each HD system, an OS (Operating System) 41 suitable for a server such as UNIX, application 43 used for specific service tasks and data 45, and the software 47 for the server duplication according to the present invention (referred to as the server duplication system herein) are stored as shown in FIG. 2. In addition, a stack 49 in which every service request to the server system 1 and the output data in response to it are stored as data log is also stored in each HD systems 14, 24 for duplication of the HD systems as described later. The application 43 may be online banking service system and various data base management systems, for example.

As described above, both servers 10 and 20 have about the same configuration and are designed so as to be able to perform the equal functions. The mode of operation of the servers in which they are operating in service for other computers is referred to as the service mode, and that in which they are operating but not in service for other computers is referred to as the standby mode. The switching between the two modes is made by the switchover controller 30. The switchover controller 30 is also a PC (personal computer) provided with communication interfaces not shown in the figure and specifies the operation mode of each server by performing bidirectional communication with both servers 10 and 20.

Next, the operation of the duplicated server system 1 is described. When the servers 10 and 20 receive a service request from a remote client over the network, they normally perform the predetermined processing in response to the service request unless otherwise operated by the system administrator at need. For convenience' sake, let us suppose that the server 10 operates in the service mode and the server 20 in the standby mode when the whole system 1 is in normal condition. The server 1 is therefore referred to as the primary server and the server 2 as the secondary server.

Figure 3:
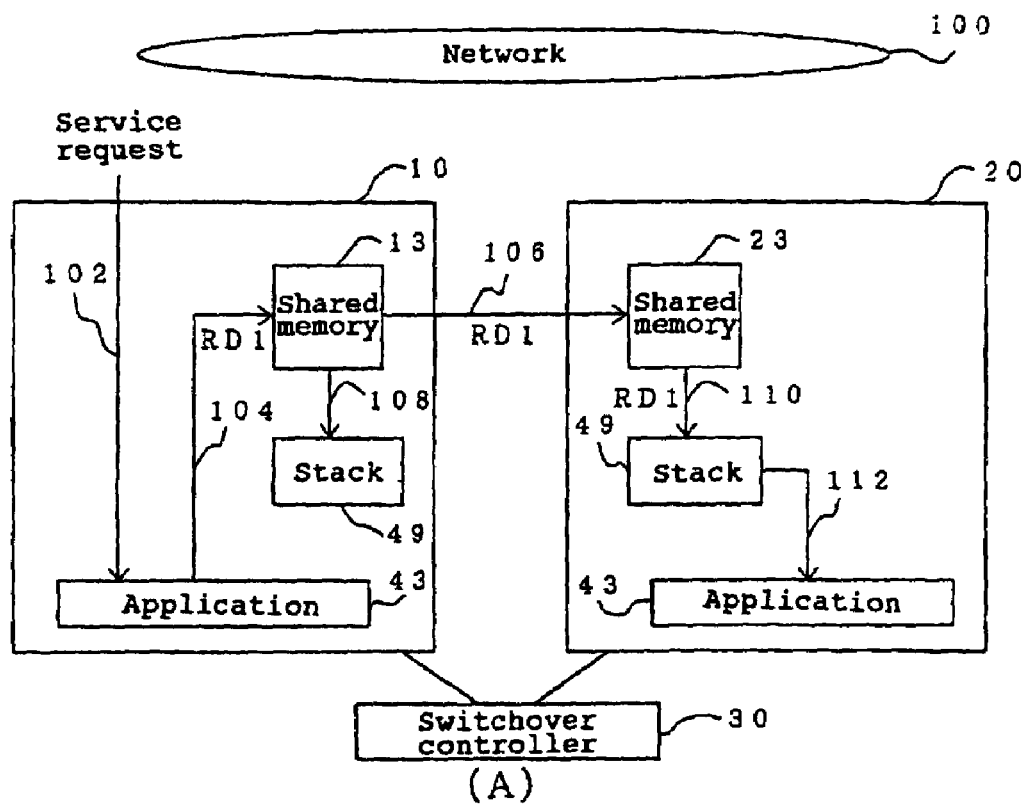
FIG. 3 illustrates the duplicate operation of the duplicated server system being an embodiment of the present invention. (A) shows the operation in case where processing involves an updating of data, and (B) shows the operation in the case of query-type processing.
Figure 3:
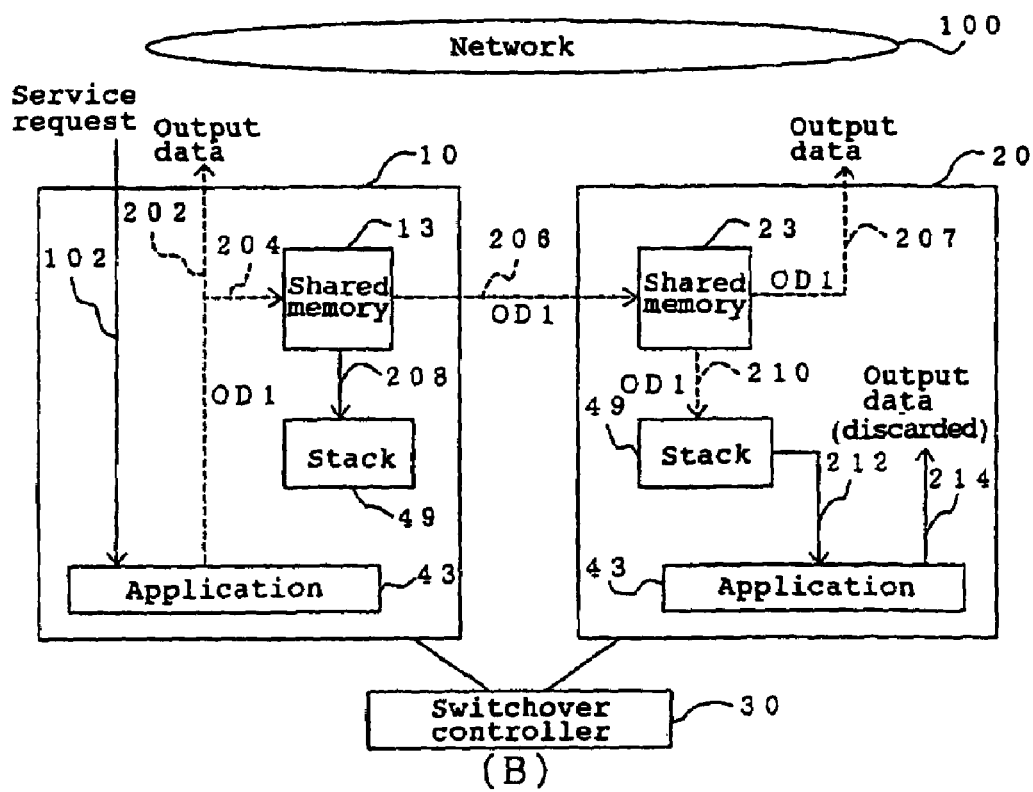

When a service request to the duplicated server system 1 (with destination MAC address Amac) is sent over the network, the NICs 12 and 22 detect the service request, and normally the NIC 12 of the primary server 10 in the service mode actually receives the service request. The operation of the primary server 10 and the secondary server 20 is shown in FIG. 3.

FIG. 3(A) shows the operation when a service request for processing that updates the application data is given over the network 100. When receiving such a service request, the server in the service mode (primary server 10, for example) passes the request to the application 43 for processing (Step 102). The application 43 then performs the processing related to the service request, and outputs various types of data used in the processing as recovery data RD1. The recovery data RD1 is written to the shared memory 13 in order to pass it to the secondary server 20 (Step 104). At this time, the recovery data RD1 is also written to the shared memory 23 of the secondary server 20 (Step 106). The recovery data RD1 written in the shared memory 13 is then stored in the stack 49 in the HD system 14 (Step 108). Similarly, on the secondary server 20, the recovery data RD1 written in the shared memory 23 is stored in the stack 49 in the HD system 24 (Step 110). Further, the secondary server 20 always executes the application 43 using the recovery data RD1 stored in the stack 49 and thereby updates the application data 45 to keep it identical to the application data on the primary server 10.

Figure 4:
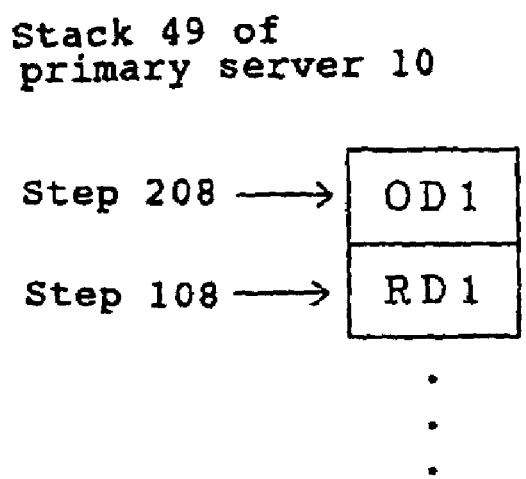
FIG. 4 shows the manner in which service requests and the output data of the processing in response to the service requests are stored in the stacks 49 of the primary server 10 and the secondary server 20.
Figure 4:
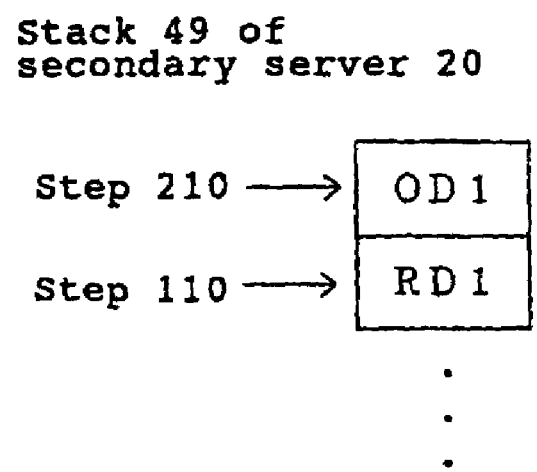

FIG. 3(B) shows the operation of the duplicated server system when it receives a service request for processing that does not involve an update of the application data 45 from the network 100. In FIG. 3(B), the service request received is passed to the application 43 (Step 102). The application 43 then performs the processing related to the service request in response and outputs output data OD1. The output data OD1 is sent back to the client over the network 100 (Step 202). The output data OD1 is also written to the shared memories 13 and 23 simultaneously (Step 204 and 206). The data OD1 written in the shared memory 13 and that in the shared memory 23 are mechanically stored in the stack 49 of the HD systems 14 and in the stack 49 of the HD systems 24, respectively (Step 208 and 210). By doing this, the stack 49 of the primary server 10 and that of the secondary server 20 always have the same log data stored as shown in FIG. 4. Therefore, by always executing the application 43 on the secondary server 20 using the log data, the duplication of the application data 45 can be achieved.

Back in FIG. 3(B), the secondary server 20 outputs the output data OD1 received by means of the shared memory 23 (Step 207). Although the application 43 on the secondary server 20 also outputs the output data because it is executed using the log data in the stack 49, this data is not used.

In both cases shown in FIGS. 3(A) and 3(B), the switchover controller 30 is monitoring the primary server 10 and the secondary server 20 with respect to the hardware. If a failure occurs on the server in the service mode (primary server 10 in this example), the switchover controller switches the primary server 10 to the standby mode and the secondary server 20 to the service mode.

Since a seamless duplication of the servers can be realized by the present invention as described above, the reliability of the servers can be enhanced.

Further, although two servers are used in the above embodiment, two or more servers can also be used as the secondary servers.

Furthermore, the stacks 49 may also be output to the internal memory of each server instead of being output to the HD system each and every time for high-speed processing.

Thus, by the present invention, a method of duplicating servers that makes possible seamless transition of the service being carried out at the occurrence of server failure, and duplicated server system and database system mirror-backed-up according to the method can be provided.

The invention claimed is:

1. A method for duplicating a first and a second server in a system, comprising:
    storing an application used for a service task and corresponding application data in each of a first and a second storage device;
    responding to a service request by storing the service request and output data as a data log in each of a first and a second stack;
    forming an address space that is the same in each of a first and a second shared memory,
        wherein the first server comprises the first storage device, the first stack, and the first shared memory,
        wherein the second server comprises the second storage device, the second stack, and the second shared memory, and
        wherein the first and the second server are configured to connect to a network and are assigned the same network address; and
    passing the service request from the first server to an application for updating application data received over the network after the service request is received,
    wherein the application is configured to process the service request and write the application data used during processing to each of the first and the second shared memory as recovery data,
    wherein the application is configured to store the recovery data written to the first and the second shared memory to the first and the second stack,
    wherein the second server is configured to update the application data by executing the application using the recovery data stored in the first and the second shared memory, wherein the application data stored on the first server is always identical to the application data stored on the second server.

2. A method for duplicating a first and a second server in a system, comprising:
    storing an application used for a service task and corresponding application data in each of a first and a second storage device;
    responding to a service request by storing the service request and output data as a data log in each of a first and a second stack, wherein the service request does not comprise a request to update the application data;
    forming an address space that is the same in each of a first and a second shared memory,
        wherein the first server comprises the first storage device, the first stack, and the first shared memory,
        wherein the second server comprises the second storage device, the second stack, and the second shared memory, and
        wherein the first and the second server are configured to connect to a network and are assigned the same network address; and
    passing the service request from the first server to an application for updating application data received over the network after the service request is received,
    wherein the application is configured to process the service request, to send the output data back to a client over the network, to write the application data used during processing to each of the first and the second shared memory as recovery data, and store the recovery data written to the first and the second shared memory to the first and the second stack,
    wherein the second server is configured to execute the application using the data log in the first and the second stacks.

3. A duplicated system server comprising:
    a first server comprising a first storage device, a first stack, and a first shared memory;
    a second server comprising a second storage device, a second stack, and a second shared memory, the first and second server being configured to connect to a network and are assigned to the same network address,
        wherein the first and the second storage devices are configured to store at least one application used for service tasks and application data, wherein the first and the second stacks are configured to store a service request and configured to store output data in a data log in response to the service request, wherein the service request does not comprise a request to update the application data, and wherein the first and the second shared memories are configured to form the same address space;

a switchover control configured to switch operation modes of the first and the second server;

wherein when the service request for updating the application data is received over the network, the switchover control switches the operation mode of the first server to service mode and the operation mode of the second server to standby mode;

wherein the first server is configured to pass the service request to the application for processing when the service request is received, the application being configured to:

process the service request, write application data used during processing to the first and the second shared memories as recovery data, and store the recovery data written to the first and second shared memories in each of the first and second stacks;

wherein the second server is configured to update the application data by executing the application using the recovery data stored in the first and the second shared memories;

wherein the first and the second servers are configured to store identical application data.

4. A duplicated system server comprising:

a first server comprising a first storage device, a first stack, and a first shared memory;

a second server comprising a second storage device, a second stack, and a second shared memory, the first and second server being configured to connect to a network and are assigned to the same network address, wherein the first and the second storage devices are configured to store at least one application used for service tasks and application data, wherein the first and the second stacks are configured to store a service request and configured to store output data in a data log in response to the service request, and wherein the first and the second shared memories are configured to form the same address space;

a switchover control configured to switch operation modes of the first and the second server;

wherein when the service request for updating the application data is received over the network, the switchover control switches the operation mode of the first server to service mode and the operation mode of the second server to standby mode;

wherein the application is configured to:

process the passed service request, send the output data back to a client over the network, write the output data to the first and the second shared memories as recovery data, and store the recovery data written to the first and the second shared memories in each of the first and the second stacks;

wherein the second server is configured to execute the application using the data log in the first and the second stacks.

* * * * *